(12) United States Patent
Ueno et al.

(10) Patent No.: US 11,350,636 B2
(45) Date of Patent: Jun. 7, 2022

(54) APPARATUS FOR SUPPLYING GRAIN AND FLOUR TO CONTAINER OF FOOD PROCESSING MACHINE

(71) Applicant: SODICK CO., LTD., Kanagawa (JP)

(72) Inventors: Maya Ueno, Kanagawa (JP); Akinori Noguchi, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 441 days.

(21) Appl. No.: 16/691,607

(22) Filed: Nov. 22, 2019

(65) Prior Publication Data

US 2020/0170261 A1 Jun. 4, 2020

(30) Foreign Application Priority Data

Nov. 29, 2018 (JP) .............................. JP2018-222998

(51) Int. Cl.
*A21C 1/14* (2006.01)
*B01F 35/71* (2022.01)

(52) U.S. Cl.
CPC .............. *A21C 1/146* (2013.01); *A21C 1/142* (2013.01); *A21C 1/1495* (2013.01); *B01F 35/718* (2022.01)

(58) Field of Classification Search
CPC ....... A21C 1/146; A21C 1/142; A21C 1/1495; A21C 1/143; B01F 35/718; B65G 53/24; B65G 53/34; B65G 53/36; B65G 53/46; B65G 53/52; B65G 53/66; B65G 2201/042; B65D 90/48
USPC ........................................................ 366/139
See application file for complete search history.

(56) References Cited

U.S. PATENT DOCUMENTS

| | | | |
|---|---|---|---|
| 5,140,516 A * | 8/1992 | Rainville ............... | B65G 53/66 700/231 |
| 8,834,011 B2 * | 9/2014 | Dietrich ................ | F26B 17/107 366/139 |
| 9,637,320 B2 * | 5/2017 | Moretto ................. | B65G 53/04 |

(Continued)

FOREIGN PATENT DOCUMENTS

GB 2263071 A * 7/1993
JP H07123900 5/1995

(Continued)

OTHER PUBLICATIONS

English translation of "Office Action of Japan Counterpart Application," dated Mar. 19, 2019, p.1-p.3.

*Primary Examiner* — Charles Cooley
(74) *Attorney, Agent, or Firm* — JCIPRNET (57) ABSTRACT

A grain and flour supply apparatus is provided, including a holding bin provided above a container and having an exhaust port from which gas is discharged, an introduction port into which grain and flour are introduced, and a supply port which supplies the grain and flour to the container; a first vacuum breaker valve opening and closing the exhaust port; a second vacuum breaker valve opening and closing the introduction port; a third vacuum breaker valve opening and closing the supply port; a temperature sensor measuring the temperature in the holding bin; a vacuum device drawing a vacuum in the holding bin; and a control device configured to control the first vacuum breaker valve, the second vacuum breaker valve, the third vacuum breaker valve, and the vacuum device, and set with a target temperature.

22 Claims, 5 Drawing Sheets

(56) References Cited

U.S. PATENT DOCUMENTS

| | | | | |
|---|---|---|---|---|
| 2008/0037364 | A1* | 2/2008 | Dietrich | B01F 25/104 366/148 |
| 2014/0348597 | A1* | 11/2014 | Moretto | B65G 43/08 406/31 |
| 2020/0170261 | A1* | 6/2020 | Ueno | A21C 1/146 |

FOREIGN PATENT DOCUMENTS

| | | |
|---|---|---|
| JP | H07222918 | 8/1995 |
| JP | H11189517 | 7/1999 |
| JP | 2000300230 | 10/2000 |
| JP | 2005143357 | 6/2005 |
| JP | 2006051037 | 2/2006 |
| JP | 2009000612 | 1/2009 |
| JP | 2012187735 | 10/2012 |

\* cited by examiner

APPARATUS FOR SUPPLYING GRAIN AND FLOUR TO CONTAINER OF FOOD PROCESSING MACHINE

CROSS-REFERENCE TO RELATED APPLICATION

This application claims the priority benefit of Japan application no. 2018-222998, filed on Nov. 29, 2018. The entirety of each of the above-mentioned patent applications is hereby incorporated by reference herein and made a part of this specification.

BACKGROUND

Technical Field

The disclosure relates to an apparatus for supplying grain and flour to a container of a food processing machine. In particular, the disclosure relates to an apparatus for supplying powdered and granular materials made of cereals or legumes to an apparatus for producing confectionery, bread or noodle dough.

Description of Related Art

In many food production plants, grain and flour such as wheat flour, barley flour, cornstarch, oat flour, rye flour, rice flour, potato flour, buckwheat flour, soy flour, wheat grain, barley grain, corn grain, oats, rye grain, rice grain, buckwheat grain, and soybeans are stored in huge outdoor silos. The grain and flour are taken out from the outdoor silos and weighed, and predetermined amounts of grain and flour are conveyed to a holding bin that is provided above a food processing machine. The holding bin is also called a hopper or a receiver tank. The grain and flour in the holding bin are gravity fed into the food processing machine.

The food processing machine is, for example, a mixer, an extruder, a stirrer or a grinder. In a plant that produces udon, for example, a predetermined size of wheat flour is stored in an outdoor silo. The wheat flour that has been weighed is conveyed to the holding bin. The wheat flour in the holding bin is gravity fed into the container of the mixer that produces udon dough.

In such a food production plant, the temperature of the grain and flour in the outdoor silo may change due to the influence of the outside air temperature during the storage period. Therefore, the temperature of the grain and flour sent to the food processing machine may become excessively high in the summer and excessively low in the winter. When the temperature of the grain and flour exceeds the appropriate temperature range, the quality of food is adversely affected. For example, if water is added to grain and flour having an excessively high temperature, gluten is excessively formed and the dough particles become large. When such dough is rolled, air may easily enter the dough. As a result, the surface of the dough sheet may become uneven and the noodles may easily break.

In general, the temperature of the material tends to be high even in a food processing machine. For example, in a grinder, the temperature of the material increases due to the heat generated by collision and cutting of the material. As a result, the flavor of the product may be impaired. Many food processing machines are equipped with a cooler to prevent the temperature of the material from rising. In order to prevent the material from freezing, a heater for maintaining the temperature of the material above 4° C. may also be provided in the food processing machines.

Japanese Patent Publication No. 2005-143357 discloses a mixer that is provided with a cooler and a heater. The mixer produces dough for noodles from flour. A gas at a predetermined temperature is supplied into the container of the mixer to directly cool or heat the flour. Furthermore, a mixer that injects hot water or cooling water into the outer wall of the container is also disclosed. The wheat flour that is often used in noodle production has a size of several tens to several hundreds of μm. Such fine flour is known to have low thermal conductivity. The equilibrium moisture of wheat flour is approximately 13% by weight when the average temperature of the material is 25° C. and the humidity is 40%. Although it depends on the bulk density, the thermal conductivity of wheat flour is 0.0409 W/(m·K) for soft flour, 0.0461 W/(m·K) for medium flour, and 0.0383 W/(m·K) for strong flour.

For this reason, when a cooler or heater using a gas or liquid as the heat medium is provided in the food processing machine, cooling or heating inside the lump of flour in the container is delayed. As a result, particularly for a large-sized food processing machine that processes a relatively large amount of flour at one time, it will take a longer time for all the flour to reach the required temperature uniformly. If the product is required to have higher quality than before, it is desirable to shorten the time required for cooling.

Japanese Patent Publication No. 7-222918 discloses a mixing device in which a horizontal rotating plate is housed in the container. A liquid supply pipe for supplying a liquid to the upper surface of the rotating plate is provided. A flour supply pipe extends upward through the ceiling of the container, and the flour is supplied from the lower end of the flour supply pipe to the upper surface of the rotating plate. A storage tank is provided above the mixing device and connected to the upper end of the flour supply pipe. A hopper is provided on the storage tank and connected to the storage tank via an on-off valve. A vacuum pump is provided to draw a vacuum in the hopper, the storage tank, and the container. The flour falls from the hopper to the container via the storage tank with small air resistance.

In general, the purpose of drawing a vacuum in the container of the mixer is to mix flour and water without mixing air bubbles. The temperature suitable for mixing flour is 5° C. or more and 25° C. or less. With the degree of vacuum in the vacuum mixer, it is difficult to lower the temperature of the flour that has become high to an appropriate temperature. In order to lower the temperature of the flour in the container by vaporization latent heat, it is necessary to strengthen the structure of the vacuum mixer so that it can withstand a pressure sufficiently low to generate vaporization latent heat. The mixer has a movable part such as a stirring blade, and it is not easy to increase the pressure resistance of the vacuum container.

In view of the above, the disclosure provides a novel grain and flour supply apparatus that can rapidly and uniformly lower the temperature of grain and flour in the holding bin to a target temperature by vaporization latent heat. Some advantages of the grain and flour supply apparatus of the disclosure are described in the detailed description.

SUMMARY

According to an embodiment of the disclosure, a grain and flour supply apparatus for supplying grain and flour to a container (2A) of a food processing machine is provided. The grain and flour supply apparatus includes: a holding bin (50) provided above the container and having an exhaust port from which gas is discharged, an introduction port into which the grain and flour are introduced, and a supply port which supplies the grain and flour to the container; a first vacuum breaker valve (51) opening and closing the exhaust port; a second vacuum breaker valve (52) opening and closing the introduction port; and a third vacuum breaker valve (53) opening and closing the supply port. The grain and flour supply apparatus further includes: a temperature sensor (54, 55, 56) measuring a temperature in the holding bin and outputting a measured temperature; a vacuum device (70) including one or more vacuum pumps (22, 71) connected to the exhaust port via the first vacuum breaker valve, and drawing a vacuum in the holding bin; and a control device (3) configured to control the first vacuum breaker valve, the second vacuum breaker valve, the third vacuum breaker valve, and the vacuum device, and set with a target temperature. The control device operates the vacuum device in a state where the first vacuum breaker valve is opened and the second vacuum breaker valve and the third vacuum breaker valve are closed until a pressure in the holding bin is lowered to a pressure, at which a temperature of the grain and flour starts to decrease due to vaporization latent heat, or less and the measured temperature in the holding bin falls to the target temperature or less.

DESCRIPTION OF THE EMBODIMENTS

Figure 1:
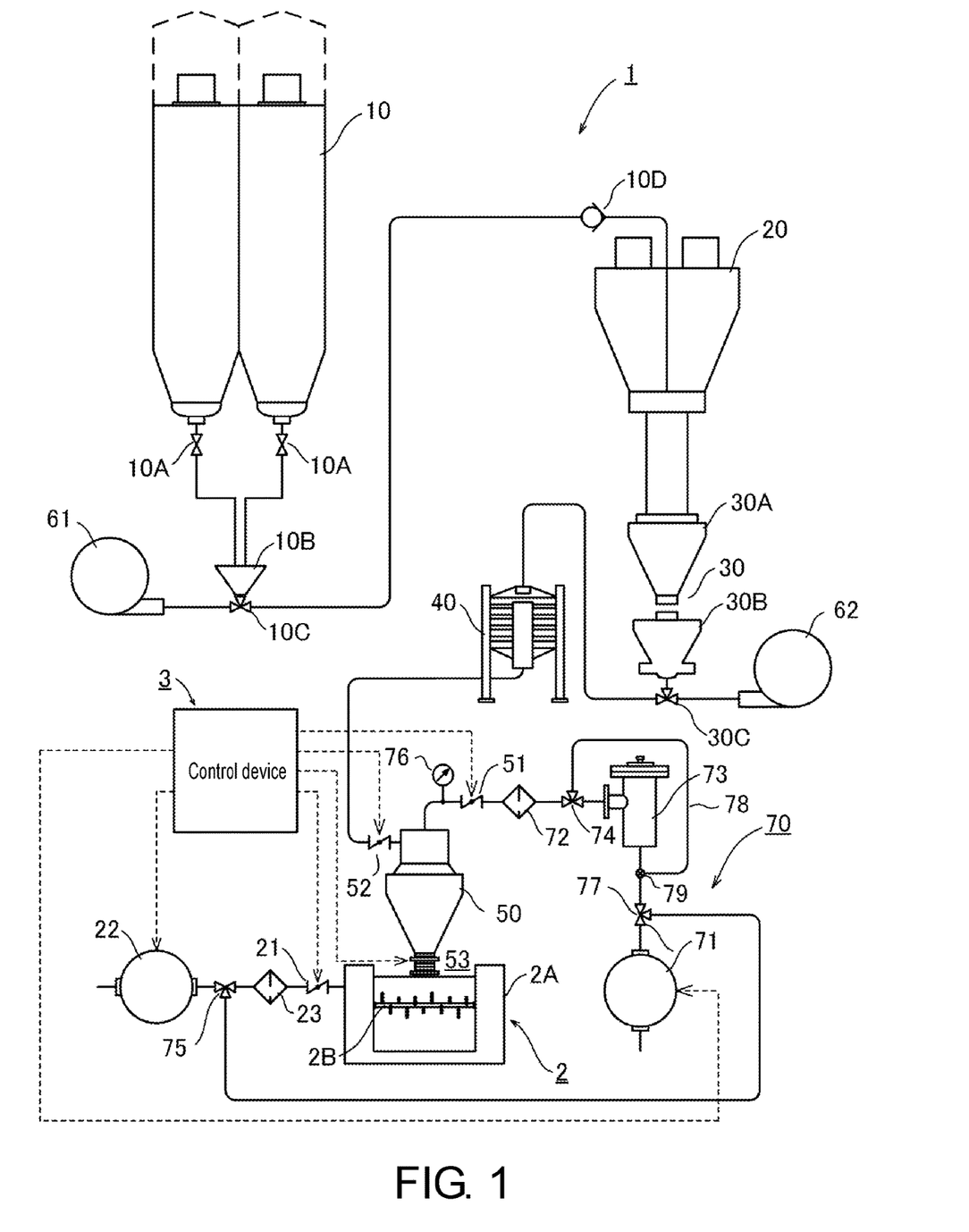
FIG. 1 is a block diagram partially showing a food production plant that includes the grain and flour supply apparatus of the disclosure.

The embodiments of the disclosure will be described in detail with reference to the drawings. The material to which the disclosure is preferably applied is grain and flour made of cereals or legumes. The grain and flour may be barley flour, cornstarch, oat flour, rye flour, rice flour, potato flour, buckwheat flour, wheat grain, barley wheat, corn grain, oats, rye grain, rice grain, buckwheat grain, and soybeans. As shown in FIG. 1, a food production plant 1 includes one or more outdoor silos 10 and a vacuum mixer 2 as an example of a food processing machine. Other food processing machines for producing dough for confectionery, bread or noodle may be a normal pressure mixer that hydrates the flour for kneading or an extruder that includes a screw rotating in a cylinder to extrude the dough into a specific shape, or the food processing machines may also be a stirrer and a grinder. A grain and flour supply apparatus that supplies wheat flour to the vacuum mixer 2 is included in the food production plant 1. The outdoor silo 10 stores wheat flour. FIG. 1 does not accurately illustrate the relative sizes of the devices in the food production plant 1.

The food production plant 1 includes a control device 3 that performs a remote operation and a continuous operation, and the control device 3 is a part of the grain and flour supply apparatus. The food production plant 1 includes a flour-use bin 20 that is an intermediate storage tank, a scale 30 which is a weighing device, an inline sifter 40, a holding bin 50 which is a vacuum container, a blower 61, 62 which is a transport device, and a vacuum device 70.

The food production plant 1 includes the vacuum device 70, and the vacuum device 70 cools the wheat flour stored in the holding bin 50. In particular, the food production plant 1 includes a humidifier 80 shown in FIG. 4. By including the humidifier 80, the grain and flour supply apparatus can not only lower the temperature of the wheat flour but also adjust the temperature within a range of error of several degrees Celsius.

The vacuum mixer 2 is a part of a noodle maker, a confectionery machine or a bread maker. The vacuum mixer 2 includes at least a container 2A and a stirring blade 2B that rotates in the container 2A. The container 2A may be called a bowl, a drum or a cylinder. The vacuum mixer 2 stirs the wheat flour, to which water and salt have been added, in the container 2A with the stirring blade 2B, and kneads it to produce dough. An intake port of a vacuum pump 22 is connected to the vacuum mixer 2 via a three-way valve 75, a filter 23, and a butterfly valve 21 which is a vacuum breaker valve. The vacuum pump 22 is a water ring vacuum pump which is the first vacuum pump. The filter 23 removes the wheat flour contained in the gas when the vacuum pump 22 draws a vacuum in the container 2A.

If the temperature of the grain and flour is maintained above 4° C. and there is no risk of freezing, it is not necessary to provide a heater for the vacuum mixer 2. In the illustrated food production plant 1, it is not necessary to provide a cooling device for the vacuum mixer 2. The vacuum mixer 2 lowers the pressure in the container 2A to a pressure suitable for mixing wheat flour. Since the pressure is 80 kPa to 10 kPa, the vacuum mixer 2 is not required to have high pressure resistance. The vacuum mixer 2 is provided with a controller that includes an operation panel (not shown). The controller of the vacuum mixer 2 is connected to the control device 3, and the control device 3 is configured to be capable of remotely operating the vacuum mixer 2.

The silo 10 stores wheat flour. The silo 10 is a tank made of stainless steel, cloth or steel. The silo 10 has an opening that can be opened and closed for introducing wheat flour on the upper surface of the tank. A valve 10A that is a gate valve is connected to the funnel-shaped bottom of the silo 10. By opening and closing the valve 10A, a predetermined amount of the wheat flour stored in the silo 10 is gravity fed into the hopper 10B each time. The lower end of the hopper 10B is connected to a three-way valve 10C. A blower 61 and the flour-use bin 20 are connected to the three-way valve 10C. When the three-way valve 10C is fully opened, the air flow generated by the blower 61 transports the wheat flour in the hopper 10B to the flour-use bin 20 via a check valve 10D.

The flour-use bin 20 temporarily stores a predetermined amount of the wheat flour transported by the blower 61 in its tank. The illustrated flour-use bin 20 is equipped with two tanks. Therefore, while storing the wheat flour transported from the hopper 10B in one tank, the flour-use bin 20 can transport the wheat flour stored in the other tank to the scale 30.

The scale 30 includes a delivery tank 30A and a weighing hopper 30B. The delivery tank 30A is provided under the flour-use bin 20 and receives the wheat flour in the flour-use bin 20. The delivery tank 30A gravity feeds the wheat flour into the weighing hopper 30B below. The scale 30 stops gravity feeding the wheat flour when the wheat flour in the weighing hopper 30B reaches a predetermined amount. The lower end of the weighing hopper 30B is connected to a three-way valve 30C. A blower 62 and the inline sifter 40 are connected to the three-way valve 30C. When the scale 30 completes weighing, the three-way valve 30C is fully opened automatically, and the air flow generated by the blower 62 transports a predetermined amount of wheat flour from the weighing hopper 30B to the holding bin 50 via the inline sifter 40. The inline sifter 40 has a vibrating screen, and allows only wheat flour of a desired size to pass and discharges foreign matter. A gravitational sifter may be used as the foreign matter removing device.

The holding bin 50 is provided right above the container 2A of the vacuum mixer 2, and temporarily stores a predetermined amount of wheat flour sent from the scale 30. The food production plant 1 may include a plurality of holding bins 50. In order to produce dough in the vacuum mixer 2, a predetermined amount of wheat flour in the holding bin 50 is gravity fed into the container 2A. The holding bin 50 is provided with a valve 51 which is the first vacuum breaker valve, a valve 52 which is the second vacuum breaker valve, and a valve 53 which is the third vacuum breaker valve. The vacuum breaker valves 51, 52, and 53 are electric butterfly valves. The vacuum in the holding bin 50 can be maintained by closing all the valves 51, 52, and 53. The holding bin 50 is connected to the vacuum device 70 via the valve 51.

The vacuum device 70 includes a vacuum pump 71, a filter 72, and a cold trap 73 which is a moisture removing device. The vacuum pump 71 is an oil-sealed rotary vacuum pump as the second vacuum pump. In general, an oil-sealed rotary vacuum pump can lower the pressure in the container from the atmospheric pressure to a "high vacuum". The "high vacuum" is determined to be $10^{-1}$ Pa to $10^{-5}$ Pa. The vacuum pump 71 may be a dry vacuum pump as the second vacuum pump. In general, a dry vacuum pump can lower the pressure in the container from the atmospheric pressure to an "intermediate vacuum". The "intermediate vacuum" is determined to be $10^2$ Pa to $10^{-1}$ Pa. The valve 51 is connected to the cold trap 73 via the filter 72 and a three-way valve 74. One end of a bypass exhaust line 78 that bypasses the cold trap 73 is connected to the three-way valve 74.

An intake port of the vacuum pump 71 is connected to the cold trap 73 via a three-way valve 77. The three-way valve 77 is connected to a three-way valve 75 provided between the intake port of the vacuum pump 22 and the butterfly valve 21. The other end of the bypass exhaust line 78 is connected to a node 79 provided between the cold trap 73 and the three-way valve 77. By switching the three-way valve 74, the gas discharged from the holding bin 50 can bypass the cold trap 73 and pass through the bypass exhaust line 78. The control device 3 can control the operations of the valves 51, 52, and 53, the three-way valves 75 and 77, the vacuum pumps 22 and 71, and the cold trap 73.

Figure 2:
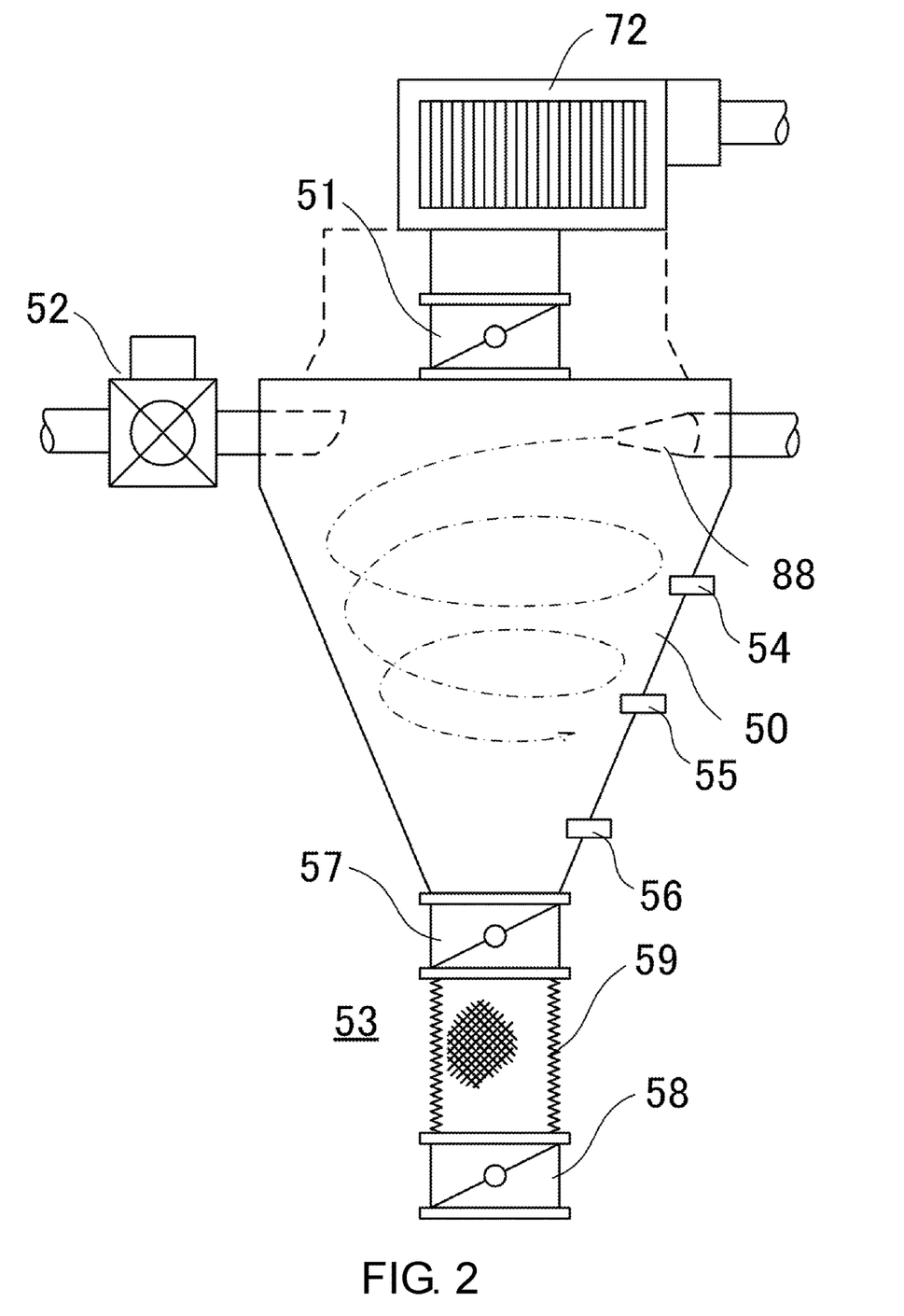
FIG. 2 is a side view showing an example of the holding bin in FIG. 1.
Figure 3:
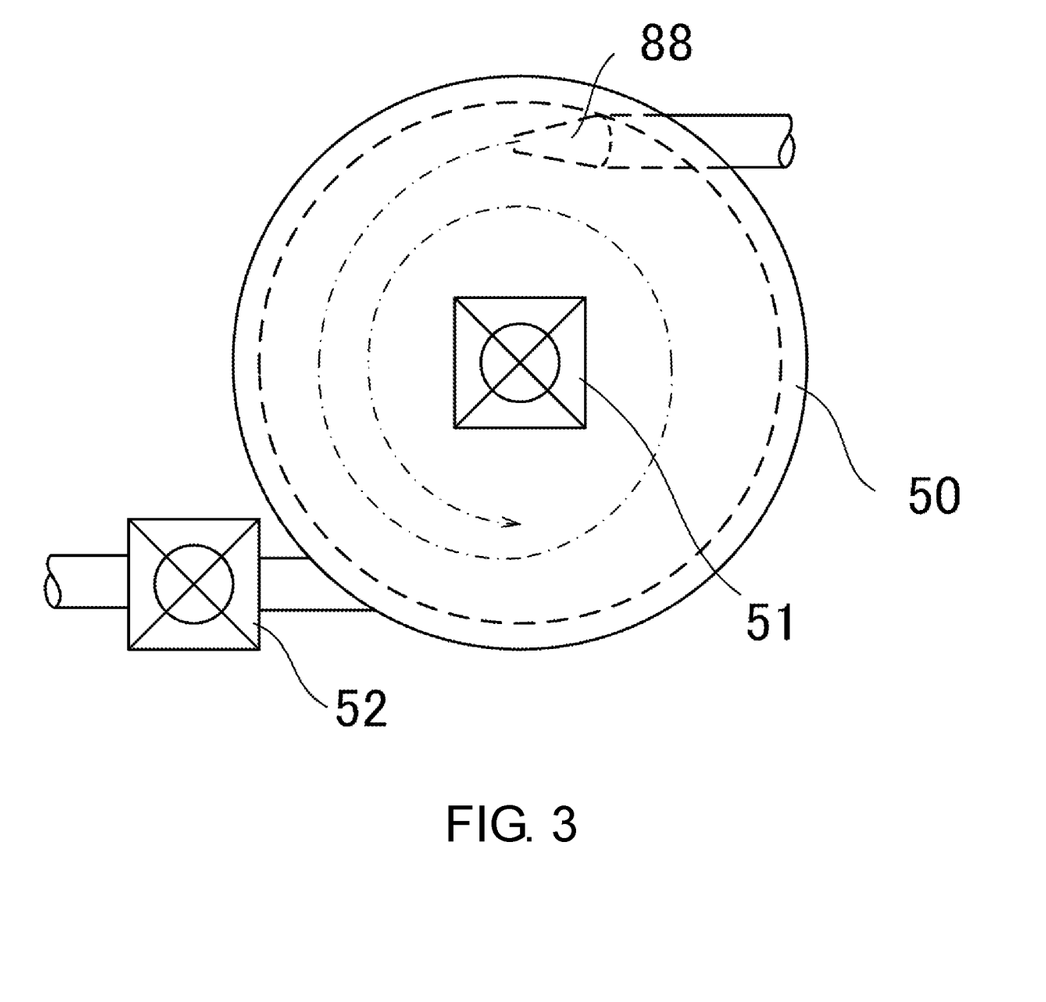
FIG. 3 is a top view showing the holding bin of FIG. 2.

The holding bin 50 will be described in detail with reference to FIG. 2 and FIG. 3. As best shown in FIG. 2, the holding bin 50 has a funnel shape so as to gravity feed the wheat flour. The filter 72 is fixed on the valve 51 and removes fine particles containing wheat flour. Temperature sensors 54, 55, and 56 are provided for measuring the temperature in the holding bin 50. The temperature sensors 54, 55, and 56 are, for example, probes having temperature detectors in the holding bin 50. The temperature detected by the probe is recorded by a data logger, and the data logger wirelessly transmits the measured temperature to the control device 3. The temperature sensors 54 and 56 are located in the upper part and the lower part of the holding bin 50 respectively. The temperature sensor 55 is located at the center of the temperature sensors 54 and 56 in height. The temperature sensors 54, 55, and 56 output the measured temperature to the control device 3.

The control device 3 switches the three-way valves 75 and 77 in synchronization, by which the vacuum pump 22 that draws a vacuum in the container 2A of the vacuum mixer 2 can be used to draw a vacuum in the holding bin 50. Thus, the vacuum pump 22 and the three-way valve 75 constitute a part of the vacuum device 70. Another water ring vacuum pump may be connected to the three-way valve 77 in place of the vacuum pump 22, and the control device 3 may control the three-way valve 77 so as to select the another water ring vacuum pump and the oil-sealed rotary vacuum pump 71. In that case, the three-way valve 75 is not required.

When the volume of the wheat flour in the holding bin 50 is very small, the control device 3 can adjust the temperature of the wheat flour only based on the measured temperature from the temperature sensor 56. When the volume of the wheat flour is large, the control device 3 can adjust the temperature in the holding bin 50 uniformly to a desired value based on the measured temperatures of the temperature sensors 54, 55, and 56. Since the holding bin 50 does not have a movable part, it is easy to strengthen compared with the container of the food processing machine. Therefore, the pressure in the holding bin 50 can be made lower than that of the container of the food processing machine.

The first vacuum breaker valve 51 is provided on the ceiling of the holding bin 50 so as to open and close the exhaust port that discharges the gas in the holding bin 50. The holding bin 50 is connected to the vacuum device 70 via the valve 51 and the filter 72. The valve 52 is provided on the side surface of the upper part of the holding bin 50 so as to open and close the introduction port that introduces the wheat flour into the holding bin 50. The holding bin 50 is connected to the scale 30 via the valve 52.

The supply port that supplies the wheat flour to the container 2A of the vacuum mixer 2 is formed in the bottom of the holding bin 50. The third vacuum breaker valve 53 is provided so as to open and close the supply port. The third vacuum breaker valve 53 includes an upper valve 57 and a lower valve 58 so as to draw a vacuum in the holding bin 50 and the container 2A at the same time. The upper valve 57 is provided in the bottom of the holding bin 50 so as to open and close the outlet that discharges the wheat flour in the holding bin 50 to the container 2A. The lower valve 58 is provided on the ceiling of the container 2A so as to open and close the inlet that introduces the wheat flour to the container 2A. The third vacuum breaker valve 53 includes a duct 59 provided between the upper valve 57 and the lower valve 58. The duct 59 forms a canvas connection for buffering vibration. The control device 3 opens and closes the upper valve 57 and the lower valve 58 at the same time.

The humidifier 80 is connected to the holding bin 50 by suitable piping. As shown in FIG. 2 and FIG. 3, the piping passes through the upper side wall of the holding bin 50. A nozzle 88 is provided at the tip of the piping to follow the inner wall surface of the holding bin 50 in order to generate mist and spray water vapor. The nozzle 88 is directed in a direction parallel to the tangent of the inner wall surface of the holding bin 50. As a result, the mist and water vapor descend in a spiral manner along the inner wall surface of the holding bin 50 and are evenly sprayed in the holding bin 50 as indicated by the dash-dot line. The water vapor supplied from the nozzle 88 is in the state of water vapor at 20° C. or more and 50° C. or less in the holding bin 50 which is in a vacuum state, and is the so-called vacuum vapor.

Figure 4:
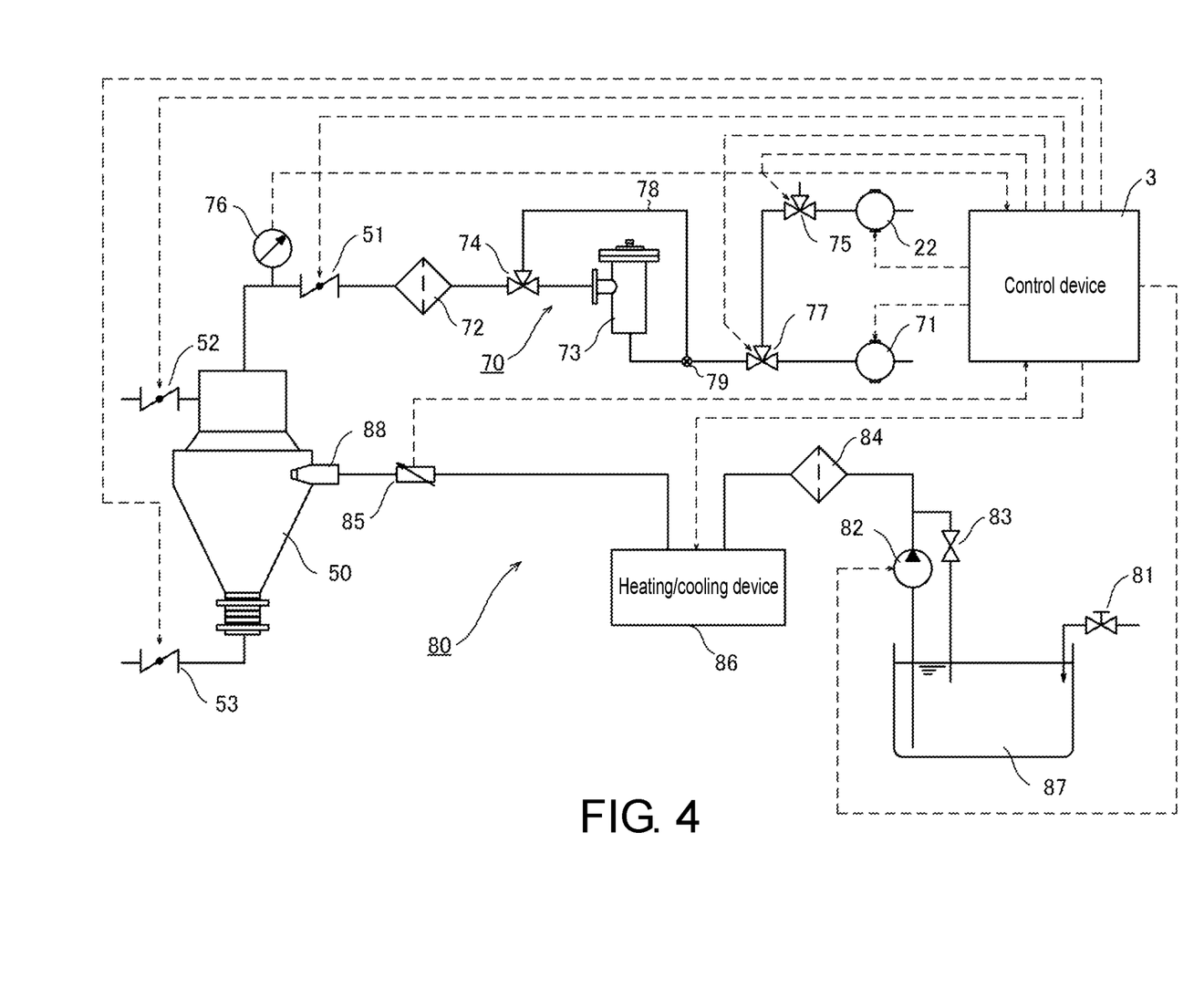
FIG. 4 is a block diagram showing the grain and flour supply apparatus of FIG. 1.

An embodiment of a grain and flour supply apparatus of the disclosure will be described with reference to FIG. 4. The grain and flour supply apparatus includes the holding bin 50, the valves 51, 52, and 53, the temperature sensors 54, 55, and 56, the vacuum device 70, a pressure sensor 76, the humidifier 80, and the control device 3. The pressure sensor 76 is connected to the holding bin 50 so as to measure the pressure in the holding bin 50. The grain and flour supply apparatus has a function of cooling the wheat flour in the holding bin 50, and the cooling is mainly achieved by the vacuum device 70.

The humidifier 80 includes the nozzle 88 which sprays mist and water vapor, a tank 87 which is a water storage tank, and a heating/cooling device 86 which heats or cools water in a range of 5° C. or more and less than 100° C. The humidifier 80 further includes a faucet 81, a water supply pump 82, a relief valve 83 which is a safety valve, a filter 84, and a temperature sensor 85 in the circuit from the water source to the nozzle 88. The tank 87 stores drinking water. In the humidifier 80 of FIG. 4, when the faucet 81 is opened, purified tap water from the water source (not shown) is supplied to the tank 87. The heating/cooling device 86 includes a heat exchanger, and is provided with a heating device for generating water vapor at 20° C. or more and 50° C. or less, and a cooling device for generating mist, which is not water vapor, at 5° C. or more and the normal temperature of 25° C. or less. The heating/cooling device 86 can be operated by switching between the heating device and the cooling device.

The vaporization latent heat of water differs depending on the water temperature, and the moisture content required until the temperature is lowered to the target water temperature is different. If the equilibrium moisture of wheat flour is about 13% by weight, the cooling time can be shortened by supplying more moisture than that. Prior to the operation of the vacuum device 70, the control device 3 controls the humidifier 80 so that mist at 5° C. or more and 25° C. or less is supplied to the holding bin 50. As a result, moisture is evenly retained in the holding bin 50, which has an advantage that the wheat flour can be cooled quickly.

When cooling or heating the wheat flour in the holding bin 50, a target pressure and a target temperature are set in the control device 3 by the operator. The target temperature is 5° C. or more and 25° C. or less which is suitable for the mixing of wheat flour. The control device 3 inputs the measured temperatures in the holding bin 50 from the temperature sensors 54, 55, and 56 and inputs the measured pressure from the pressure sensor 76.

When the temperature of the wheat flour in the holding bin 50 falls below the appropriate temperature, the control device 3 closes all the valves 51, 52, and 53. Further, the control device 3 operates the water supply pump 83 and the heating/cooling device 86 so that the humidifier 80 supplies water vapor at 20° C. or more and 50° C. or less to the holding bin 50. The water vapor sprayed from the nozzle 88 to the low-temperature holding bin 50 rapidly changes into water. As a result, the temperature in the holding bin 50 rapidly rises due to the condensation latent heat. The control device 3 compares at least one measured temperature of the temperature sensors 54, 55, and 56 with the target temperature. The control device 3 stops the water supply pump 83 and the heating/cooling device 86 when at least one measured temperature falls to the target temperature or less. Compared with using a general heater to directly heat the inside of the holding bin 50, the temperature of the wheat flour can be increased from a low temperature to around 10° C. in a shorter time. Since the humidifier 80 preliminarily raises the temperature of the wheat flour in the holding bin 50, the vacuum mixer 2 does not require a heater.

When cooling the wheat flour in the holding bin 50, the control device 3 opens the valve 51 and closes the valve 52 and the valve 53. The control device 3 operates the valve 77 and the valve 75 to operate the vacuum pump 22, and the vacuum device 70 draws a vacuum in the holding bin 50. The control device 3 controls the valve 74 to select the bypass exhaust line 78 in order to improve the exhaust efficiency. The gas in the holding bin 50 is sent to the vacuum pump 22 through the valve 51, the filter 72, the three-way valve 74, the bypass exhaust line 78, the node 79, and the three-way valves 77 and 75. Fine particles containing unwanted wheat flour are removed by the filter 72.

Figure 5:
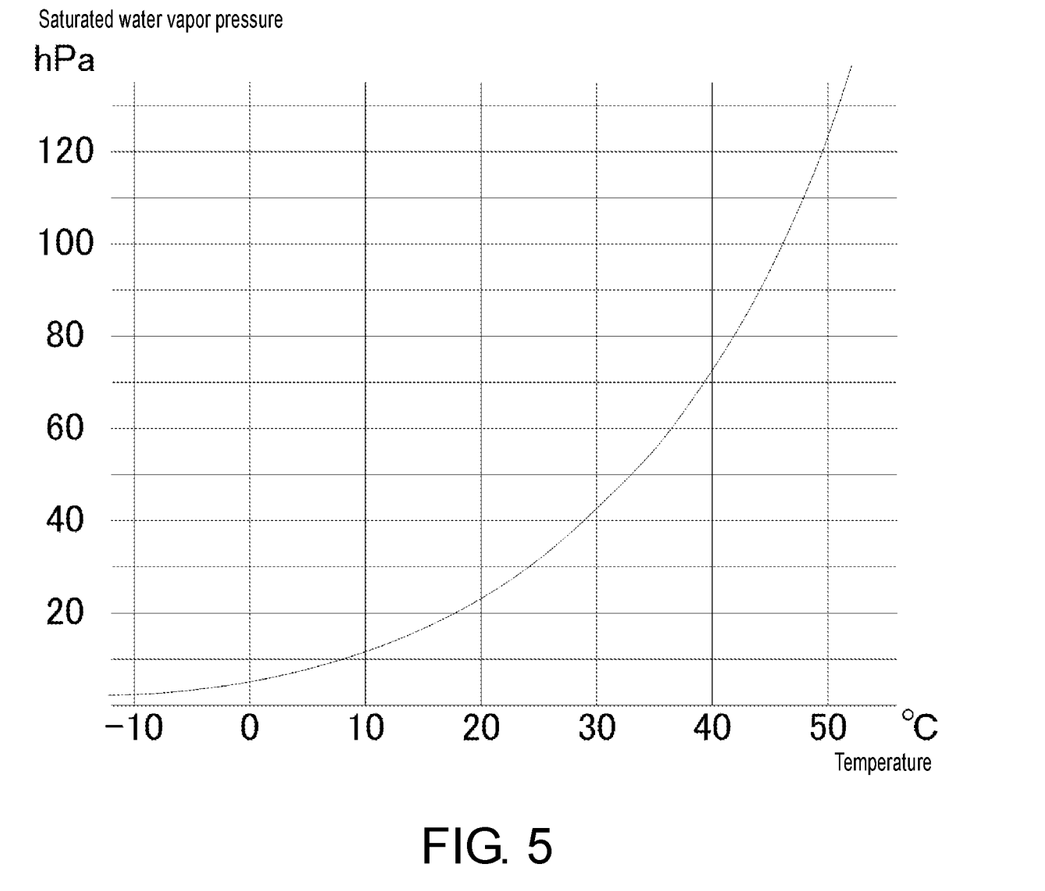
FIG. 5 is a graph showing the relationship between water temperature and saturated water vapor pressure.

Thus, the vacuum device 70 reduces the pressure in the holding bin 50 to a pressure, at which the temperature in the holding bin 50 starts to decrease due to the vaporization latent heat, or less. Referring to the graph of FIG. 5, a pressure of 40 hPa is required in order to expect cooling by vaporization latent heat for wheat flour at 30° C. If the target temperatures are 25° C., 20° C., 15° C., 10° C., and 5° C., the required pressures are 31.69 hPa, 23.38 hPa, 17.06 hPa, 12.28 hPa, and 8.73 hPa or less, respectively.

In general, the water ring vacuum pump has a relatively high exhaust speed, but the ultimate pressure is about 8 kPa. The ultimate pressure is the lowest pressure that the vacuum pump can exhaust alone. It is difficult for the water ring vacuum pump to achieve the cooling effect by vaporization latent heat alone. In general, the oil-sealed rotary vacuum pump has an ultimate pressure that reaches a "high vacuum", but the exhaust speed is not high. In the initial stage of drawing a vacuum, a large amount of air moves, and grain and flour are likely to soar and cause the oil-sealed rotary vacuum pump to malfunction. The control device 3 controls the opening and closing of the valves 75 and 77 so as to operate the water ring vacuum pump 22 until the pressure in the holding bin 50 is lowered to the target pressure. The target pressure is about 16.3 kPa depending on the capacity of the pump or the capacity of the holding bin. The water ring vacuum pump 22 greatly improves the cooling speed when the holding bin 50 stores a large amount of wheat flour.

The control device 3 compares the measured pressure with the target pressure. When the measured pressure falls to the target pressure or less, the control device 3 stops the vacuum pump 22. The control device 3 operates the valve 74 to incorporate the cold trap 73 into the exhaust line. The control device 3 controls the opening and closing of the valves 75 and 77 so as to operate the vacuum pump 71 which is an oil-sealed rotary vacuum pump. When the control device 3 operates the vacuum pump 71, the gas remaining in the holding bin 50 is sent to the vacuum pump 71 through the valve 51, the filter 72, the three-way valve 74, the cold trap 73, the node 79, and the three-way valve 77. The moisture that may cause the oil-sealed rotary vacuum pump to malfunction is removed by the cold trap 73. The pressure in the holding bin 50 is further reduced by the vacuum pump 71 as compared with the target pressure.

The control device 3 compares at least one measured temperature of the temperature sensors 54, 55, and 56 with the target temperature. When at least one measured temperature falls to the target temperature or less, the control device 3 stops the vacuum pump 71 and closes the valve 51. The control device 3 slowly opens the valve 53, returns the pressure in the holding bin 50 to the normal pressure, and gravity feeds the wheat flour into the container 2A.

When the moisture content is not sufficient in the cooling period of the wheat flour, the control device 3 operates the water supply pump 82 and the heating/cooling device 86. Thus, mist at 5° C. or more and 25° C. or less, which is not water vapor, is sprayed from the nozzle 88 to the holding bin 50. The mist diffuses and remains in the holding bin 50 while descending in a spiral manner in the holding bin 50. As a result, falling of the temperature due to vaporization latent heat is promoted, and the cooling time is shortened.

According to an embodiment of the disclosure, a grain and flour supply apparatus for supplying grain and flour to a container (2A) of a food processing machine is provided. The grain and flour supply apparatus includes: a holding bin (50) provided above the container and having an exhaust port from which gas is discharged, an introduction port into which the grain and flour are introduced, and a supply port which supplies the grain and flour to the container; a first vacuum breaker valve (51) opening and closing the exhaust port; a second vacuum breaker valve (52) opening and closing the introduction port; and a third vacuum breaker valve (53) opening and closing the supply port. The grain and flour supply apparatus further includes: a temperature sensor (54, 55, 56) measuring a temperature in the holding bin and outputting a measured temperature; a vacuum device (70) including one or more vacuum pumps (22, 71) connected to the exhaust port via the first vacuum breaker valve, and drawing a vacuum the holding bin; and a control device (3) configured to control the first vacuum breaker valve, the second vacuum breaker valve, the third vacuum breaker valve, and the vacuum device, and set with a target temperature. The control device operates the vacuum device in a state where the first vacuum breaker valve is opened and the second vacuum breaker valve and the third vacuum breaker valve are closed until a pressure in the holding bin is lowered to a pressure, at which a temperature of the grain and flour starts to decrease due to vaporization latent heat, or less and the measured temperature in the holding bin falls to the target temperature or less.

Preferably, the target temperature is 5° C. or more and 25° C. or less. The holding bin has a funnel shape. The grain and flour include wheat flour, barley flour, cornstarch, oat flour, rye flour, rice flour, potato flour, buckwheat flour, soy flour, wheat grain, barley grain, corn grain, oats, rye grain, rice grain, buckwheat grain, and soybeans.

Preferably, the vacuum device includes a first vacuum pump (22) and a second vacuum pump (71), and the control device connects one of the first vacuum pump and the second vacuum pump to the exhaust port. The first vacuum pump is a water ring vacuum pump and the second vacuum pump is an oil-sealed rotary vacuum pump or a dry vacuum pump.

Preferably, the vacuum device includes a first three-way valve (77) connected to the exhaust port, the first vacuum pump, and the second vacuum pump. When the food processing machine is a vacuum mixer (2) that hydrates flour for kneading, the vacuum device includes a second three-way valve (75) connected to the vacuum mixer, the first vacuum pump, and the first three-way valve, and the control device connects one of the first vacuum pump and the second vacuum pump to the exhaust port.

Preferably, the grain and flour supply apparatus further includes a pressure sensor (76) measuring the pressure in the holding bin and providing a measured pressure to the control device. The control device connects the first vacuum pump to the exhaust port, and when the measured pressure reaches a target pressure, the control device stops the first vacuum pump and connects the second vacuum pump to the exhaust port to lower the pressure in the holding bin below the target pressure. The control device stops the second vacuum pump when the measured temperature reaches the target temperature.

Preferably, the vacuum device includes a cold trap (73) connected between the first vacuum breaker valve and the one or more vacuum pumps. The vacuum device includes a bypass exhaust line (78) connected between the first vacuum breaker valve and the one or more vacuum pumps to bypass the cold trap. The vacuum device includes a third three-way valve (74) connected between the first vacuum breaker valve and the cold trap, and a node (79) connected between the cold trap and the one or more vacuum pumps, wherein the bypass exhaust line connects the third three-way valve to the node.

Preferably, the grain and flour supply apparatus further includes a pressure sensor measuring the pressure in the holding bin and providing a measured pressure to the control device. The control device sends gas in the holding bin to the one or more vacuum pumps via the bypass exhaust line, and when the measured pressure reaches a target pressure, the control device sends the gas in the holding bin to the one or more vacuum pumps via the cold trap.

Preferably, the grain and flour supply apparatus further includes a humidifier supplying mist at 5° C. or more and 25° C. or less to the holding bin, wherein the control device controls the humidifier to supply the mist prior to an operation of the vacuum device. The humidifier includes a nozzle that is directed in a direction parallel to a tangent of an inner wall surface of the holding bin and sprays the mist.

Preferably, the grain and flour supply apparatus further includes a humidifier supplying water vapor at 20° C. or more and 50° C. or less to the holding bin to increase the temperature in the holding bin by condensation latent heat. The humidifier includes a nozzle that is directed in a direction parallel to a tangent of an inner wall surface of the holding bin and sprays the water vapor.

The food processing machine is, for example, a vacuum mixer that hydrates flour for kneading to produce dough. In that case, the third vacuum breaker valve includes an upper valve (57), a lower valve (58), and a duct (59) that is provided between the upper valve and the lower valve and forms a canvas connection for buffering vibration.

The disclosure is not limited to the embodiments described above. It is possible to modify the embodiments, replace the members, and combine the grain and flour supply apparatus of the disclosure with a known apparatus without departing from the technical concept of the disclosure. The control device 3 selects one of the cold trap 73 and the bypass exhaust line 78 by controlling the three-way valve 74. In addition, the control device 3 selects one of the vacuum pumps 22 and 71 by controlling the three-way valves 77 and 75. One skilled in the art can switch between the two elements with other configurations.

What is claimed is:

1. A grain and flour supply apparatus for supplying grain and flour to a container of a food processing machine, comprising:
    a holding bin provided above the container and comprising an exhaust port from which gas is discharged, an introduction port into which the grain and flour are introduced, and a supply port which supplies the grain and flour to the container;
    a first vacuum breaker valve opening and closing the exhaust port;
    a second vacuum breaker valve opening and closing the introduction port;
    a third vacuum breaker valve opening and closing the supply port;
    a temperature sensor measuring a temperature in the holding bin and outputting a measured temperature;

a vacuum device comprising one or more vacuum pumps connected to the exhaust port via the first vacuum breaker valve, and drawing a vacuum in the holding bin; and a control device configured to control the first vacuum breaker valve, the second vacuum breaker valve, the third vacuum breaker valve, and the vacuum device, and set with a target temperature, wherein the control device operates the vacuum device in a state where the first vacuum breaker valve is opened and the second vacuum breaker valve and the third vacuum breaker valve are closed until a pressure in the holding bin is lowered to a pressure, at which a temperature of the grain and flour starts to decrease due to vaporization latent heat, or less and the measured temperature in the holding bin falls to the target temperature or less.

2. The grain and flour supply apparatus according to claim 1, wherein the target temperature is 5° C. or more and 25° C. or less.

3. The grain and flour supply apparatus according to claim 1, wherein the holding bin has a funnel shape.

4. The grain and flour supply apparatus according to claim 1, wherein the grain and flour comprise wheat flour, barley flour, cornstarch, oat flour, rye flour, rice flour, potato flour, buckwheat flour, soy flour, wheat grain, barley grain, corn grain, oats, rye grain, rice grain, buckwheat grain, and soybeans.

5. The grain and flour supply apparatus according to claim 1, wherein the vacuum device comprises a first vacuum pump and a second vacuum pump, and the control device connects one of the first vacuum pump and the second vacuum pump to the exhaust port.

6. The grain and flour supply apparatus according to claim 5, wherein the first vacuum pump is a water ring vacuum pump and the second vacuum pump is an oil-sealed rotary vacuum pump or a dry vacuum pump.

7. The grain and flour supply apparatus according to claim 5, wherein the vacuum device comprises a first three-way valve connected to the exhaust port, the first vacuum pump, and the second vacuum pump.

8. The grain and flour supply apparatus according to claim 7, wherein the food processing machine is a vacuum mixer that hydrates flour for kneading, the vacuum device comprises a second three-way valve connected to the vacuum mixer, the first vacuum pump, and the first three-way valve, and the control device connects one of the first vacuum pump and the second vacuum pump to the exhaust port.

9. The grain and flour supply apparatus according to claim 5, further comprising a pressure sensor measuring the pressure in the holding bin and providing a measured pressure to the control device, wherein the control device connects the first vacuum pump to the exhaust port, and when the measured pressure reaches a target pressure, the control device stops the first vacuum pump and connects the second vacuum pump to the exhaust port to lower the pressure in the holding bin below the target pressure.

10. The grain and flour supply apparatus according to claim 9, wherein the control device stops the second vacuum pump when the measured temperature reaches the target temperature.

11. The grain and flour supply apparatus according to claim 1, wherein the vacuum device comprises a cold trap connected between the first vacuum breaker valve and the one or more vacuum pumps.

12. The grain and flour supply apparatus according to claim 11, wherein the vacuum device comprises a bypass exhaust line connected between the first vacuum breaker valve and the one or more vacuum pumps to bypass the cold trap.

13. The grain and flour supply apparatus according to claim 12, wherein the vacuum device comprises a third three-way valve connected between the first vacuum breaker valve and the cold trap, and a node connected between the cold trap and the one or more vacuum pumps, wherein the bypass exhaust line connects the third three-way valve to the node.

14. The grain and flour supply apparatus according to claim 12, further comprising a pressure sensor measuring the pressure in the holding bin and providing a measured pressure to the control device, wherein the control device sends gas in the holding bin to the one or more vacuum pumps via the bypass exhaust line, and when the measured pressure reaches a target pressure, the control device sends the gas in the holding bin to the one or more vacuum pumps via the cold trap.

15. The grain and flour supply apparatus according to claim 1, further comprising a humidifier supplying mist at 5° C. or more and 25° C. or less to the holding bin, wherein the control device controls the humidifier to supply the mist prior to an operation of the vacuum device.

16. The grain and flour supply apparatus according to claim 15, wherein the humidifier comprises a nozzle that is directed in a direction parallel to a tangent of an inner wall surface of the holding bin and sprays the mist.

17. The grain and flour supply apparatus according to claim 1, further comprising a humidifier supplying water vapor at 20° C. or more and 50° C. or less to the holding bin to increase the temperature in the holding bin by condensation latent heat.

18. The grain and flour supply apparatus according to claim 17, wherein the humidifier comprises a nozzle that is directed in a direction parallel to a tangent of an inner wall surface of the holding bin and sprays the water vapor.

19. The grain and flour supply apparatus according to claim 1, wherein the food processing machine produces dough for confectionery, bread or noodle.

20. The grain and flour supply apparatus according to claim 19, wherein the food processing machine is an extruder that has a rotating screw and extrudes the dough into a specific shape.

21. The grain and flour supply apparatus according to claim 19, wherein the food processing machine is a mixer that hydrates flour for kneading to produce the dough.

22. The grain and flour supply apparatus according to claim 21, wherein the mixer is a vacuum mixer, and the third vacuum breaker valve comprises an upper valve, a lower valve, and a duct that is provided between the upper valve and the lower valve and forms a canvas connection for buffering vibration.

* * * * *